(12) United States Patent
Yanagawa et al.

(10) Patent No.: US 9,382,484 B2
(45) Date of Patent: Jul. 5, 2016

(54) PRODUCTION METHOD OF MONOCYCLIC AROMATIC HYDROCARBONS

(75) Inventors: Shinichiro Yanagawa, Tokyo (JP); Masahide Kobayashi, Tokyo (JP); Yasuyuki Iwasa, Tokyo (JP); Ryoji Ida, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 248 days.

(21) Appl. No.: 13/976,701

(22) PCT Filed: Dec. 28, 2011

(86) PCT No.: PCT/JP2011/080417
§ 371 (c)(1),
(2), (4) Date: Jun. 27, 2013

(87) PCT Pub. No.: WO2012/091099
PCT Pub. Date: Jul. 5, 2012

(65) Prior Publication Data
US 2013/0281756 A1     Oct. 24, 2013

(30) Foreign Application Priority Data
Dec. 28, 2010   (JP) ................................. 2010-294186

(51) Int. Cl.
| | | |
|---|---|---|
| C07C 4/18 | (2006.01) | |
| C07C 5/00 | (2006.01) | |
| C10G 11/05 | (2006.01) | |
| C10G 11/18 | (2006.01) | |
| B01J 37/04 | (2006.01) | |
| B01J 29/80 | (2006.01) | |
| B01J 37/00 | (2006.01) | |
| C10G 45/68 | (2006.01) | |
| C10G 69/04 | (2006.01) | |
| B01J 29/40 | (2006.01) | |
| B01J 29/65 | (2006.01) | |
| B01J 29/70 | (2006.01) | |
| B01J 29/82 | (2006.01) | |
| B01J 29/87 | (2006.01) | |
| B01J 35/10 | (2006.01) | |

(52) U.S. Cl.
CPC ................. *C10G 11/05* (2013.01); *B01J 29/80* (2013.01); *B01J 37/0009* (2013.01); *B01J 37/04* (2013.01); *C10G 11/18* (2013.01); *C10G 45/68* (2013.01); *C10G 69/04* (2013.01); *B01J 29/40* (2013.01); *B01J 29/65* (2013.01); *B01J 29/703* (2013.01); *B01J 29/7042* (2013.01); *B01J 29/7046* (2013.01); *B01J 29/82* (2013.01); *B01J 29/87* (2013.01); *B01J 35/10* (2013.01); *B01J 2229/18* (2013.01); *B01J 2229/42* (2013.01); *B01J 2229/20* (2013.01); *B01J 2229/42* (2013.01); *C10G 2300/1037* (2013.01); *C10G 2300/301* (2013.01); *C10G 2400/30* (2013.01)

(58) Field of Classification Search
CPC .................................... C07C 4/18; C07C 5/00
USPC .................................. 585/440, 470, 476, 483
See application file for complete search history.

(56) References Cited

U.S. PATENT DOCUMENTS

| | | |
|---|---|---|
| 4,394,300 A | 7/1983 | Chu et al. |
| 4,585,545 A | 4/1986 | Yancey, Jr. et al. |
| 5,770,047 A | 6/1998 | Salazar et al. |
| 5,898,089 A | 4/1999 | Drake et al. |
| 6,255,243 B1 | 7/2001 | Drake et al. |
| 6,617,275 B1 | 9/2003 | Sharma et al. |
| 2001/0056217 A1 | 12/2001 | Froment et al. |
| 2007/0293714 A1 | 12/2007 | Long et al. |
| 2009/0314683 A1 | 12/2009 | Matsushita |
| 2011/0270005 A1* | 11/2011 | Yanagawa et al. ............ 585/430 |

FOREIGN PATENT DOCUMENTS

| | | |
|---|---|---|
| EP | 1762299 A1 | 3/2007 |
| EP | 2050731 A1 | 4/2009 |
| JP | S6019726 A | 1/1985 |
| JP | H03-002128 A | 1/1991 |
| JP | H03-026791 A | 2/1991 |
| JP | H03-052993 A | 3/1991 |
| JP | H1060457 A | 3/1998 |
| JP | 2001525725 A | 12/2001 |
| JP | 2002-525380 A | 8/2002 |
| JP | 2007-190520 A | 8/2007 |
| JP | 2007-530266 A | 11/2007 |
| KR | 20010012397 A | 2/2001 |
| WO | 9851409 A1 | 11/1998 |

(Continued)

OTHER PUBLICATIONS

Extended European Search Report issued Jul. 21, 2014 in EP Application No. 11853615.0.
Int'l Search Report issued Mar. 6, 2012 in Int'l Application No. PCT/JP2011/080417.
International Search Report issued Jun. 29, 2010 in International Application No. PCT/JP2010/002171.
International Search Report issued Jun. 29, 2010 in International Application No. PCT/JP2010/002227.

(Continued)

*Primary Examiner* — Thuan D Dang
(74) *Attorney, Agent, or Firm* — Panitch Schwarze Belisario & Nadel LLP

(57) ABSTRACT

In the production method of monocyclic aromatic hydrocarbons, oil feedstock having a 10 volume % distillation temperature of 140° C. or higher and a 90 volume % distillation temperature of 380° C. or lower is brought into contact with a catalyst for producing monocyclic aromatic hydrocarbons that includes a mixture containing a first catalyst which contains crystalline aluminosilicate containing gallium and/or zinc and phosphorus and a second catalyst which contains crystalline aluminosilicate containing phosphorus.

7 Claims, No Drawings

(56) References Cited

FOREIGN PATENT DOCUMENTS

| | | |
|---|---|---|
| WO | 0018853 A1 | 4/2000 |
| WO | 2007135769 A1 | 11/2007 |
| WO | 2010109897 A1 | 9/2010 |
| WO | 2011001572 A1 | 1/2011 |
| WO | 2011090121 A1 | 7/2011 |

OTHER PUBLICATIONS

Office Action issued Apr. 18, 2013 in U.S. Appl. No. 13/138,065 by Yanagawa.
Office Action issued May 20, 2013 in CN Application No. 201080028411.1.
Office Action issued May 24, 2013 in CN Application No. 201080032470.6.
Extended Search Report issued Jul. 23, 2013 in EP Application No. 10804025.4.
Extended Search Report issued Jul. 24, 2013 in EP Application No. 10793750.0.
Office Action issued Aug. 28, 2013 in U.S. Appl. No. 13/138,065 by Yanagawa.
Office Action issued Jul. 18, 2014 in CN Application No. 201080028411.1.
Office Action issued Apr. 30, 2015 in MY Application No. PI2011006058.
Office Action issued Dec. 9, 2015 in KR Application No. 1020127002908.
Yang et al., "Boronation and galliation of zeolite b in an alkaline medium," Materials Chemistry and Physics, vol. 63, pp. 55-66 (2000).

* cited by examiner

PRODUCTION METHOD OF MONOCYCLIC AROMATIC HYDROCARBONS

CROSS-REFERENCE TO RELATED APPLICATION

This application is a Section 371 of International Application No. PCT/JP2011/080417, filed Dec. 28, 2011, which was published in the Japanese language on Jul. 5, 2012 under International Publication No. WO 2012/091099 A1, and the disclosure of which is incorporated herein by reference.

TECHNICAL FIELD

The present invention related to a production method of monocyclic aromatic hydrocarbons that is for producing monocyclic aromatic hydrocarbons from oil containing a large amount of polycyclic aromatic hydrocarbons.

Priority is claimed on Japanese Patent Application No. 2010-294186, filed Dec. 28, 2010, the content of which is incorporated herein by reference.

BACKGROUND ART

Light Cycle Oil (hereinafter, called "LCO") as cracked light oil that is generated by a fluidized catalytic cracking contains a large amount of polycyclic aromatic hydrocarbon and is used as light oil or heavy oil. However, in recent years, investigations have been conducted to obtain, from LCO, monocyclic aromatic hydrocarbons having 6 to 8 carbon numbers (for example, benzene, toluene, xylene, ethylbenzene and the like), which can be utilized as high octane value gasoline base materials or petrochemical feedstocks and have a high added value.

For example, Patent Documents 1 to 3 suggest methods for producing monocyclic aromatic hydrocarbons from polycyclic aromatic hydrocarbons that are contained in LCO and the like in a large amount, by using a zeolite catalyst.

However, Patent Documents 1 to 3 do not disclose that the yield of monocyclic aromatic hydrocarbon having 6 to 8 carbon number produced by the method is sufficiently high.

When monocyclic aromatic hydrocarbons are produced from heavy crude oil containing polycyclic aromatic hydrocarbons, catalyst regeneration for removing a carbonaceous substance needs to be performed with a high frequency since a large amount of carbonaceous substance is precipitated on the catalyst and rapidly decreases the activity. Moreover, when a circulating fluidized bed for performing a process of efficiently repeating reaction-catalyst regeneration is employed, the temperature for catalyst regeneration needs to be higher than the reaction temperature, so the temperature environment of the catalyst becomes more severe.

When a zeolite catalyst is used as a catalyst under such a severe condition, hydrothermal deterioration of the catalyst progresses, and the reaction activity decreases over time. Accordingly, the improvement of hydrothermal stability is required for the catalyst. However, for the zeolite catalyst disclosed in Patent Documents 1 to 3, a measure for improving hydrothermal stability was not taken, and the practical usefulness thereof was extremely low.

As the method for improving hydrothermal stability, a method using zeolite having a high Si/Al ratio, a method of stabilizing a catalyst by performing hydrothermal treatment in advance, such as in USY type zeolite, a method of adding phosphorus to zeolite, a method of adding a rare-earth metal to zeolite, a method of improving a structure directing agent at the time of zeolite synthesis, and the like are known.

Among these, addition of phosphorus is known to have effects that improve not only the hydrothermal stability but also the selectivity resulting from inhibiting the precipitation of a carbonaceous substance during fluidized catalytic cracking, the abrasion resistance of a binder, and the like. Accordingly, phosphorus is frequently added to catalysts for a catalytic cracking reaction.

Catalysts for catalytic cracking that are obtained by adding phosphorus to zeolite are disclosed in, for example, Patent Documents 4 to 6.

That is, Patent Document 4 discloses a method of producing olefins from naphtha by using a catalyst containing ZSM-5 to which phosphorus, gallium, germanium, or tin has been added. Patent Document 4 aims to improve the selectivity in generating olefins by inhibiting generation of methane or an aromatic fraction by method of adding phosphorus, and to improve the yield of olefins by securing high activity with a short contact time.

Patent Document 5 discloses a method of producing olefins from heavy hydrocarbons with a high yield, by using a catalyst in which phosphorus is supported on ZSM-5 containing zirconium and a rear-earth metal and a catalyst which contains USY zeolite, REY zeolite, kaolin, silica, and alumina.

Patent Document 6 discloses a method of producing ethylene and propylene with a high yield, by converting hydrocarbons by using a catalyst containing ZSM-5 supporting phosphorus and a transition metal.

As described above, addition of phosphorus to zeolite is disclosed in Patent Documents 4 to 6. However, all of the methods mainly aimed to improve the yield of olefins, and failed to produce monocyclic aromatic hydrocarbons having 6 to 8 carbon number with a high yield. For example, though Table 2 of Patent Document 6 discloses the yield of olefins (ethylene and propylene) and BTX (benzene, toluene, and xylene), the yield of olefins is 40 mass %, but the yield of BTX is as low as about 6 mass %.

Accordingly, a catalyst for producing monocyclic aromatic hydrocarbons that makes it possible to produce monocyclic aromatic hydrocarbons having 6 to 8 carbon number with a high yield from oil feedstock containing polycyclic aromatic hydrocarbons and to prevent the reduction in the yield of the monocyclic aromatic hydrocarbons caused over time has not practically become known.

PRIOR ART DOCUMENTS

Patent Documents

[Patent Document 1] Japanese Unexamined Patent Application, First Publication No. H3-2128
[Patent Document 2] Japanese Unexamined Patent Application, First Publication No. H3-52993
[Patent Document 3] Japanese Unexamined Patent Application, First Publication No. H3-26791
[Patent Document 4] Published Japanese Translation No. 2002-525380 of the PCT International Publication
[Patent Document 5] Japanese Unexamined Patent Application, First Publication No. 2007-190520
[Patent Document 6] Published Japanese Translation No. 2007-530266 of the PCT International Publication

DISCLOSURE OF INVENTION

Problems to be Solved by the Invention

The present invention aims to provide a production method of monocyclic aromatic hydrocarbons that can produce monocyclic aromatic hydrocarbons having 6 to 8 carbon number with a high yield from oil feedstock containing polycyclic aromatic hydrocarbons.

Means to Solve the Problems

[1] A production method of monocyclic aromatic hydrocarbons having 6 to 8 carbon number, includes a step of bringing oil feedstock having a 10 volume % distillation temperature of 140° C. or higher and a 90 volume % distillation temperature of 380° C. or lower into contact with a catalyst for producing monocyclic aromatic hydrocarbons that includes a mixture containing a first catalyst which contains crystalline aluminosilicate containing gallium and/or zinc and phosphorus and a second catalyst which contains crystalline aluminosilicate containing phosphorus.

[2] The production method of monocyclic aromatic hydrocarbons having 6 to 8 carbon number according to [1], in which in the first catalyst, the content of gallium and/or zinc contained in the crystalline aluminosilicate is 0.05 to 2.0 mass % based on the crystalline aluminosilicate.

[3] The production method of monocyclic aromatic hydrocarbons having 6 to 8 carbon number according to [1] or [2], in which in the catalyst for producing monocyclic aromatic hydrocarbons, the content of gallium and/or zinc is 0.02 to 1.0 mass % based on the weight of the catalyst.

[4] The production method of monocyclic aromatic hydrocarbons having 6 to 8 carbon number according to any one of [1] to [3], in which the crystalline aluminosilicate is medium pore size zeolite.

[5] The production method of monocyclic aromatic hydrocarbons having 6 to 8 carbon number according to any one of [1] to [4], in which the crystalline aluminosilicate is MFI type zeolite.

[6] The production method of monocyclic aromatic hydrocarbons having 6 to 8 carbon number according to any one of [1] to [5], in which the oil feedstock contains light cycle oil generated by a fluidized catalytic cracking.

[7] The production method of monocyclic aromatic hydrocarbons having 6 to 8 carbon number according to any one of [1] to [6], in which the oil feedstock is brought into contact with the catalyst for producing monocyclic aromatic hydrocarbons by using a fluidized-bed reaction equipment.

Effect of the Invention

According to the production method of monocyclic aromatic hydrocarbons having 6 to 8 carbon number of the present invention, it is possible to further reduce the content of gallium and/or zinc in the catalyst for producing monocyclic aromatic hydrocarbons based on the total weight of the catalyst compared to the related art. Accordingly, production cost of the catalyst can be greatly reduced. Moreover, monocyclic aromatic hydrocarbons having 6 to 8 carbon number can be produced with a high yield from oil feedstock containing polycyclic aromatic hydrocarbons. In addition, when the catalyst according to the present invention is used in a fluidized bed, it is easy to add the first and second catalysts respectively at any ratio according to the properties of oil feedstock or deterioration of the activity of the catalyst, whereby the catalytic activity can be maintained and improved.

BEST MODE FOR CARRYING OUT THE INVENTION

Hereinafter, an embodiment of the production method of monocyclic aromatic hydrocarbons of the present invention that is for producing monocyclic aromatic hydrocarbons from oil containing a large amount of polycyclic aromatic hydrocarbons will be described.

(Catalyst for Producing Monocyclic Aromatic Hydrocarbons)

The catalyst for producing monocyclic aromatic hydrocarbons that is used in the present embodiment is for producing monocyclic aromatic hydrocarbons having 6 to 8 carbon number (hereinafter, abbreviated to "monocyclic aromatic hydrocarbons") from oil feedstock containing polycyclic aromatic hydrocarbons and saturated hydrocarbons. The catalyst is a mixture of a first catalyst containing crystalline aluminosilicate which contains gallium and/or zinc and phosphorus and a second catalyst containing crystalline aluminosilicate which contains phosphorus. Hereinafter, the catalyst for producing monocyclic aromatic hydrocarbons is abbreviated to a "mixed catalyst" in some cases.

[Crystalline Aluminosilicate]

The crystalline aluminosilicate contained in the first or second catalyst that is used in the present embodiment is not particularly limited, but is preferably, for example, pentasil type zeolite or medium pore size zeolite. As the medium pore size zeolite, zeolites having an MFI, MEL, TON, MTT, MRE, FER, AEL, or EUO type crystal structure are more preferable. Particularly, zeolites having an MFI and/or MEL type crystal structure are preferable since they further increase the yield of monocyclic aromatic hydrocarbons.

The zeolites of MFI type, MEL type, and the like belong to zeolites having known types of structures that are publicly introduced by The Structure Commission of the International Zeolite Association (Atlas of Zeolite Structure Types, W. M. Meiyer and D. H. Olson (1978), Distributed by Polycrystal Book Service, Pittsburgh, Pa., USA).

Provided that the total amount of the catalyst is 100 mass %, the content of the crystalline aluminosilicate in the first or second catalyst is preferably 10 to 95 mass %, more preferably 20 to 80 mass %, and particularly preferably 25 to 70 mass %. If the content of the crystalline aluminosilicate is from 10 mass % to 95 mass %, a sufficiently high degree of catalytic activity is obtained.

[Gallium and Zinc]

As the form of the first catalyst used in the present embodiment that contains gallium and/or zinc, there is the form in which gallium or zinc is incorporated into the lattice skeleton of crystalline aluminosilicate (crystalline aluminogallosilicate and/or crystalline aluminozincosilicate), the form in which gallium is supported on crystalline aluminosilicate (gallium-supported crystalline aluminosilicate) and/or the form in which zinc is supported on crystalline aluminosilicate (zinc-supported crystalline aluminosilicate), and the form as a combination of both of them, for example.

The crystalline aluminogallosilicate has a structure in which $SiO_4$, $AlO_4$, and $GaO_4$ structures form tetrahedral coordination in the skeleton, and the crystalline aluminozincosilicate has a structure in which $SiO_4$, $AlO_4$, and $ZnO_4$ structures form tetrahedral coordination in the skeleton. Moreover, the crystalline aluminogallosilicate and/or crystalline aluminozincosilicate are (is) obtained by, for example, crystallization of gel by hydrothermal synthesis, a method of inserting gallium and/or zinc into the lattice skeleton of crystalline aluminosilicate, and a method of inserting aluminum into the lattice skeleton of crystalline aluminogallosilicate and/or crystalline aluminozincosilicate.

The gallium-supported crystalline aluminosilicate and/or zinc-supported crystalline aluminosilicate are (is) a substance in which gallium and/or zinc are (is) supported on crystalline aluminosilicate by a known method such as ion exchange, impregnation, or the like. Examples of the source of gallium or zinc used at this time are not particularly limited and include gallium salts such as gallium nitrate and gallium chloride, gallium oxide, zinc salts such as zinc nitrate and zinc chloride, zinc oxide, and the like.

Provided that the total mass of the crystalline aluminosilicate in the first catalyst is 100 mass %, the content of gallium and/or zinc in the first catalyst used in the present embodiment is preferably 0.05 to 2.0 mass %. The lower limit of the content is more preferably 0.1 mass % or more, and the upper limit thereof is more preferably 1.6 mass %, and particularly preferably 1.0 mass % or less. If the content of the gallium supported on the crystalline aluminosilicate in the first catalyst is 0.05 mass % or more, the reduction in the yield of monocyclic aromatic hydrocarbons caused over time can be prevented, and if the content is 2.0 mass % or less, the yield of monocyclic aromatic hydrocarbons can be increased.

In addition, the content of gallium and/or zinc in the catalyst for producing monocyclic aromatic hydrocarbons that is used in the present embodiment is preferably 0.02 to 1.0 mass % based on the total weight of the mixed catalyst (total mass of the first and second catalysts). The lower limit of the content is more preferably 0.05 mass % or more, and the upper limit thereof is more preferably 0.9 mass % and more preferably 0.8 mass % or less. If the content of gallium and/or zinc based on the total weight of the mixed catalyst is 0.02 mass % or more, the reduction in the yield of monocyclic aromatic hydrocarbons caused over time can be prevented, and if the content is 1.0 mass % or less, the yield of monocyclic aromatic hydrocarbons can be increased.

The first catalyst used in the present embodiment may be a catalyst containing gallium or zinc individually or a catalyst containing both of them. Moreover, the catalyst may further contain other metals in addition to gallium and/or zinc.

On the other hand, the second catalyst used in the present embodiment is a catalyst not containing gallium and/or zinc.

[Phosphorus]

Provided that the total mass of the crystalline aluminosilicate in the first or second catalyst is 100 mass %, the content of phosphorus contained in the crystalline aluminosilicate in the first or second catalyst that is used in the present embodiment is preferably 0.1 to 3.5 mass %. The lower limit of the content is more preferably 0.2 mass % or more, and the upper limit thereof is more preferably 3.0 mass % and particularly preferably 2.5 mass % or less. If the content of phosphorus contained in the crystalline aluminosilicate in the first or second catalyst is 0.1 mass % or more, the reduction in the yield of monocyclic aromatic hydrocarbons caused over time can be prevented, and if the content is 3.5 mass % or less, the yield of monocyclic aromatic hydrocarbons can be increased. In addition, as the content of phosphorus contained in the crystalline aluminosilicate in the first or second catalyst, an individual value is employed for each catalyst within the above specific range.

The method of adding phosphorus to the first or second catalyst used in the present embodiment is not particularly limited, and examples thereof include a method of adding a phosphorus compound to crystalline aluminosilicate, crystalline aluminogallosilicate, or crystalline aluminozincosilicate by ion exchange, impregnation, or the like so as to cause phosphorus to be supported on crystalline aluminosilicate, a method of replacing a portion of the inside of the crystalline aluminosilicate skeleton with phosphorus by adding a phosphorus compound during zeolite synthesis, a method of using a phosphorus-containing crystallization accelerator during zeolite synthesis, and the like. An aqueous phosphate ion-containing solution used at this time is not particularly limited, and it is possible to preferably use solutions that are prepared by dissolving phosphoric acid, diammonium hydrogen phosphate, ammonium dihydrogen phosphate, other water-soluble phosphates, and the like in water at any concentration.

The first catalyst used in the present embodiment is obtained by calcining (at 300° C. to 900° C.) the crystalline aluminogallosilicate, crystalline aluminozincosilicate, or crystalline aluminosilicate supporting gallium and/or zinc and phosphorus that contains phosphorus as described above.

The second catalyst used in the present embodiment is obtained by calcining (at 300° C. to 900° C.) the crystalline aluminosilicate that contains phosphorus as described above.

[Shape]

The first or second catalyst used in the present embodiment is shaped into, for example, powder, granules, pellets, and the like, according to the reaction mode. For example, the catalyst is shaped into powder in the case of a fluidized bed and shaped into granules or pellets in the case of a fixed bed. An average particle size of the catalyst used in a fluidized bed is preferably 30 to 180 μm, and more preferably 50 to 100 μm. Moreover, a bulk density of the catalyst used in a fluidized bed is preferably 0.4 to 1.8 g/cc, and more preferably 0.5 to 1.0 g/cc.

The average particle size indicates a size of particles accounting for 50 mass % in a particle size distribution obtained by classification performed by sieving, and the bulk density is a value measured by the method of JIS standard R9301-2-3.

In order to obtain the catalyst having a granule or pellet form, an inactive oxide as a binder may be optionally mixed into crystalline aluminosilicate or a catalyst, and then the resultant may be molded using various molding machines.

The method for molding the catalyst for producing monocyclic aromatic hydrocarbons that is used in the present embodiment is not particularly limited. Each of the first and second catalysts that has been molded separately may be mixed with each other, or a mixture of the first and the second catalyst may be molded.

When the first or second catalyst used in the present embodiment contains an inorganic oxide such as a binder, inorganic oxide containing phosphorus may be used as a binder.

In addition, when the first or second catalyst contains an inorganic oxide such as a binder, a binder or the like may be mixed with crystalline aluminosilicate, and then gallium and/or zinc and phosphorus may be added thereto to produce the first or second catalyst. Alternatively, a binder or the like may be mixed with gallium and/or zinc-supported crystalline aluminosilicate, or a binder or the like may be mixed with crystalline aluminogallosilicate and/or crystalline alluminozincosilicate, and then phosphorus may be added thereto to produce the first or second catalyst. Moreover, an inorganic oxide such as a binder may be added to the mixed catalyst which is a mixture of the first and second catalysts.

Examples of the inorganic oxide such as a binder include silica, alumina, zirconia, titania, a mixture thereof, or the like. When the first or second catalyst contains an inorganic oxide such as a binder, the content of the binder is preferably 10 to 80 mass %, and more preferably 25 to 75 mass % based on the total weight of the mixed catalyst (total mass of the first and second catalysts). As the content of the binder in the first or second catalyst, an individual value is employed for each catalyst within the above specific range.

When the first or second catalyst contains an inorganic oxide such as a phosphorus-containing binder, the content of phosphorus is preferably 0.1 to 10 mass % based on the total weight of the mixed catalyst (total mass of the first and second catalysts). In addition, the lower limit of the content is more preferably 0.2 mass % or more, and the upper limit thereof is more preferably 9 mass % or less and particularly preferably 8 mass % or less. If the content of phosphorus based on the total weight of the catalyst is 0.1 mass % or more, the reduction in the yield of monocyclic aromatic hydrocarbons caused over time can be prevented, and if the content is 10 mass % or less, the yield of monocyclic aromatic hydrocarbons can be increased.

The content of the first catalyst in the catalyst for producing monocyclic aromatic hydrocarbons that is used in the present embodiment is preferably 2.0 to 98 mass % based on the total weight of the mixed catalyst (total mass of the first and second catalysts). In addition, the lower limit of the content is more preferably 4 mass % or more, and the upper limit thereof is more preferably 95 mass %, even more preferably 80 mass % or less, and particularly preferably 65 mass % or less. If the content of the first catalyst based on the total weight of the mixed catalyst is 2.0 mass % or more, the reduction in the yield of monocyclic aromatic hydrocarbons caused over time can be prevented, and if it is 98 mass % or less, the yield of monocyclic aromatic hydrocarbons can be increased.

On the other hand, the content of the second catalyst is preferably 2 to 98 mass % based on the total weight of the mixed catalyst (total mass of the first and second catalysts). In addition, the upper limit of the content is more preferably 96 mass %, and the lower limit thereof is more preferably 5 mass % or more, even more preferably 20 mass % or more, and particularly preferably 35 mass % or more. If the content of the second catalyst is 2 mass % or more, the reduction in the yield of monocyclic aromatic hydrocarbons caused over time can be prevented, and if it is 98 mass % or less, the yield of monocyclic aromatic hydrocarbons can be increased.

(Production Method of Monocyclic Aromatic Hydrocarbons)

The production method of monocyclic aromatic hydrocarbons of the present embodiment is a method of bringing oil feedstock into contact with the catalyst for forming monocyclic aromatic hydrocarbons to undergo a reaction.

The reaction is a method in which the oil feedstock is caused to come into contact with an acid point of the catalyst to undergo various reactions such as cracking, dehydrogenation, cyclization, and hydrogen transfer, whereby polycyclic aromatic hydrocarbons undergoes ring opening and are converted into monocyclic aromatic hydrocarbons.

[Oil Feedstock]

The oil feedstock used in the present embodiment is oil having a 10 volume % distillation temperature of 140° C. or higher and a 90 volume % distillation temperature of 380° C. or lower. If oil having a 10 volume % distillation temperature of lower than 140° C. is used, BTX is produced from light oil, and this does not fit for the main object of the present embodiment. Accordingly, the 10 volume % distillation temperature of the oil is preferably 140° C. or higher, and more preferably 150° C. or higher. Moreover, when oil feedstock having a 90 volume % distillation temperature of higher than 380° C. is used, the amount of coke deposited onto the catalyst increases, whereby the catalytic activity tends to be rapidly reduced. Accordingly, the 90 volume % distillation temperature of the oil feedstock is preferably 380° C. or lower, and more preferably 360° C. or lower.

In addition, the 10 volume % distillation temperature, 90 volume % distillation temperature, and endpoint described herein are values measured based on JIS K2254 "Petroleum products-Determination of distillation characteristics".

Examples of the oil feedstock having a 10 volume % distillation temperature of 140° C. or higher and a 90 volume % distillation temperature of 380° C. or lower include light cycle oil (LCO) generated by a fluidized catalytic cracking, coal-liquefied oil, hydrocracked and refined heavy oil, straight-run kerosene, straight-run light oil, coker kerosene, coker light oil, hydrocracked and refined oil sand oil, or the like. Among these, light cycle oil (LCO) generated by a fluidized catalytic cracking is more preferable.

If the oil feedstock contains a large amount of polycyclic aromatic hydrocarbons, the yield of monocyclic aromatic hydrocarbons having 6 to 8 carbon number decreases. Accordingly, the content of polycyclic aromatic hydrocarbons (polycyclic aromatic fraction) in the oil feedstock is preferably 50 volume % or less, and more preferably 30 volume % or less.

In addition, the polycyclic aromatic fraction described herein refers to the sum of the content of bicyclic aromatic hydrocarbon (bicyclic aromatic fraction) and the content of aromatic hydrocarbon having three or more rings (aromatic fraction having three or more rings) that are measured based on JPI-5S-49 "Petroleum products-Determination of hydrocarbon types-High performance liquid chromatography".

[Reaction Mode]

As the reaction mode at the time when the oil feedstock is brought into contact with the catalyst for producing monocyclic aromatic hydrocarbons and reacted, a fixed bed, a moving bed, a fluidized bed, and the like are exemplified. In the present embodiment, a heavy fraction is used as oil feedstock. Accordingly, a fluidized bed that makes it possible to continuously remove the fraction of coke attached to the catalyst and to stably carry out the reaction is preferable. Particularly, a continuous regeneration-type fluidized bed that can cause the catalyst to circulate between a reactor and regenerator and can continuously repeat reaction-regeneration is preferable. It is preferable that the oil feedstock to be brought into contact with the catalyst be in a gaseous state. Moreover, the oil feedstock may be optionally diluted with gas, and when unreacted oil is generated, this may be optionally recycled.

[Reaction Temperature]

The reaction temperature at the time when the oil feedstock is brought into contact with the catalyst for producing monocyclic aromatic hydrocarbons and reacted is not particularly limited, but is preferably 350 to 700° C. The lower limit of the temperature is more preferably 450° C. or higher since sufficient reaction activity is obtained. On the other hand, the upper limit thereof is more preferably 650° C. or lower since this temperature is advantageous in view of energy and makes it possible to easily regenerate the catalyst.

[Reaction Pressure]

The reaction pressure at the time when the oil feedstock is brought into contact with the catalyst for producing monocyclic aromatic hydrocarbons and reacted is preferably 1.5 MPaG or lower, and more preferably 1.0 MPaG or lower. If the reaction pressure is 1.5 MPaG or lower, it is possible to prevent light gas from being additionally generated and to diminish pressure resistance of the reaction apparatus. Though not particularly limited, the lower limit of the reaction pressure is preferably equal to or higher than normal pressure in view of cost and the like.

[Contact Time]

The time for which the oil feedstock comes into contact with the catalyst for producing monocyclic aromatic hydrocarbons is not particularly limited as long as a substantially desired reaction is caused. For example, the contact time is preferably 1 second to 300 seconds in terms of the time required for gas on the catalyst to pass. The lower limit of the contact time is more preferably 5 seconds or longer, and the upper limit thereof is more preferably 150 seconds or shorter.

If the contact time is 1 second or longer, the reaction can be caused reliably, and if it is 300 seconds or shorter, it is possible to inhibit a carbonaceous substance from being accumulated onto the catalyst by coking or the like, and to suppress the amount of light gas generated by cracking.

In the production method of monocyclic aromatic hydrocarbons of the present embodiment, the oil feedstock is brought into contact with an acid point of the catalyst to undergo various reactions such as cracking, dehydrogenation, cyclization, and hydrogen transfer and cause ring opening of polycyclic aromatic hydrocarbon, thereby obtaining monocyclic aromatic hydrocarbon.

In the present embodiment, the yield of monocyclic aromatic hydrocarbons is preferably 15 mass % or more, more preferably 20 mass % or more, and even more preferably 25 mass % or more. If the yield of monocyclic aromatic hydrocarbons is less than 15 mass %, this is not preferable since the concentration of the target substance in the product decreases, and recovery efficiency is lowered.

In the production method of the present embodiment that has been described so far, the catalyst for producing monocyclic aromatic hydrocarbons described above is used. Accordingly, the content of gallium and/or zinc based on the total weight of the mixed catalyst can be further reduced compared to the related art. Consequently, production cost of the catalyst can be greatly reduced, and monocyclic aromatic hydrocarbons can be produced with a high yield. In addition, when the catalyst according to the present embodiment is used in a fluidized bed, it is easy to respectively add the first and second catalysts at any ratio according to the properties of oil feedstock or deterioration of the activity of the catalyst, whereby the catalytic activity can be maintained and improved.

Incidentally, if gallium and/or zinc are (is) supported on crystalline aluminosilicate, the value of acid point in the catalyst decreases, and the ability of the catalyst as an acidic catalyst is impaired. Therefore, cracking ability of the catalyst is suppressed. On the other hand, if gallium is supported on crystalline aluminosilicate, it is possible to produce BTX (benzene, toluene, and xylene) in more amount by dehydrogenating and cyclizing liquefied petroleum gas (LPG), light naphtha, or the like.

If gallium and/or zinc are (is) present in a catalyst in a certain amount, effects are obtained. Therefore, in the production method of the present embodiment, the first catalyst containing gallium and/or zinc to a certain degree is allowed to coexist with the second catalyst not containing gallium and/or zinc so as to inhibit the decrease in the value of acid point. In this manner, the yield of BTX can be increased.

EXAMPLE

Hereinafter, the present invention will be described in more detail based on examples and comparative examples, but the present invention is not limited to these examples.

Example 1

Preparation of First Catalyst-1

A solution (A) containing 1706.1 g of sodium silicate (J sodium silicate No. 3, $SiO_2$: 28 to 30 mass %, Na: 9 to 10 mass %, balance: water, manufactured by Nippon Chemical Industrial Co., LTD.) and 2227.5 g of water and a solution (B) containing 64.2 g of $Al_2(SO_4)_3 \cdot 14$ to $18H_2O$ (special grade chemical, manufactured by Wako Pure Chemical Industries, Ltd.), 369.2 g of tetrapropylammonium bromide, 152.1 g of $H_2SO_4$ (97 mass %), 326.6 g of NaCl, and 2975.7 g of water were prepared respectively.

Subsequently, while the solution (A) was being stirred at room temperature, the solution (B) was slowly added to the solution (A).

The obtained mixture was vigorously stirred with a mixer for 15 minutes to break up the gel, whereby the mixture was put in the state of a homogenous fine emulsion.

Thereafter, the mixture was put in a stainless steel autoclave and subjected to crystallization operation under a self-pressure in natural course of events, at a temperature of 165° C. for 72 hours at a stirring speed of 100 rpm. After the crystallization operation ended, the product was filtered to collect a solid product, and the operation in which the solid product was washed with about 5 L of deionized water and filtered was repeated 5 times. The solid content separated and obtained by filtration was dried at 120° C. and calcined for 3 hours at 550° C. under an air flow.

X-ray diffraction analysis (name of instrument: Rigaku RINT-2500V) was performed on the obtained calcined product, and as a result, it was confirmed that the product had an MFI structure. Moreover, a $SiO_2/Al_2O_3$ ratio (molar ratio) thereof confirmed by X-ray fluorescence analysis (name of instrument: Rigaku ZSX101e) was 64.8. In addition, the content of elemental aluminum contained in the lattice skeleton that was calculated from the above result was 1.32 mass %.

A 30 mass % aqueous ammonium nitrate solution was added to the obtained calcined product in such a ratio that 5 mL of the solution was added to 1 g of the product. The mixture was heated for 2 hours at 100° C. and stirred, followed by filtration and washing with water. This operation was repeated 4 times, and then the resultant was dried for 3 hours at 120° C., thereby obtaining ammonium-type crystalline aluminosilicate. Thereafter, calcination was performed for 3 hours at 780° C., thereby obtaining proton-type crystalline aluminosilicate.

Subsequently, 120 g of the obtained proton-type crystalline aluminosilicate was impregnated with 120 g of an aqueous gallium nitrate solution such that 0.1 mass % (value calculated when the total mass of the crystalline aluminosilicate is regarded as being 100 mass %) of gallium was supported on the proton-type crystalline aluminosilicate, followed by drying at 120° C. Thereafter, the resultant was calcined for 3 hours at 780° C. under an air flow, thereby obtaining a gallium-supported crystalline aluminosilicate.

Thereafter, 30 g of the obtained gallium-supported crystalline aluminosilicate was impregnated with 30 g of an aqueous diammonium hydrogen phosphate solution such that 0.7 mass % (value calculated when the mass of the crystalline aluminosilicate is regarded as being 100 mass %) of phosphorus was supported on the gallium-supported crystalline aluminosilicate, followed by drying at 120° C. Thereafter, the resultant was calcined for 3 hours at 780° C. under an air flow, thereby obtaining a first catalyst-1 containing crystalline aluminosilicate and gallium.

[Preparation of Second Catalyst]

30 g of the proton-type crystalline aluminosilicate was impregnated with 30 g of an aqueous diammonium hydrogen phosphate solution such that 0.7 mass % (value calculated when the total weight of the catalyst is regarded as being 100 mass %) of phosphorus was supported on the proton-type crystalline aluminosilicate, followed by drying at 120° C. Thereafter, the resultant was calcined for 3 hours at 780° C. under an air flow, thereby obtaining a second catalyst containing crystalline aluminosilicate and phosphorus.

[Preparation of Catalyst 1]

A pressure of 39.2 MPa (400 kgf) was applied to each of the obtained first catalyst-1 and the second catalyst so as to form tablets, and the resultant was coarsely pulverized to have a size of 20 to 28 mesh, thereby obtaining granular catalysts. Subsequently, the catalysts were mixed with each other such that the content of the first catalyst-1 became 50.0 mass % based on the total weight of the mixed catalyst (total mass of the first and second catalysts), thereby obtaining a granular catalyst 1.

The content of gallium (average gallium content) based on the total weight of the catalyst 1 (total mass of the first and second catalysts) was 0.05 mass %.

Example 2

Preparation of First Catalyst-2

A first catalyst-2 was obtained in the same manner as in Example 1, except that after gallium-supported crystalline aluminosilicate in which 0.2 mass % of gallium was supported on proton-type crystalline aluminosilicate was obtained, the concentration of an aqueous diammonium hydrogen phosphate solution was adjusted such that 0.7 mass % (value calculated when the total mass of the crystalline aluminosilicate is regarded as being 100 mass %) of phosphorus was supported on the gallium-supported crystalline aluminosilicate, and the gallium-supported crystalline aluminosilicate was impregnated with 30 g of the aqueous solution.

[Preparation of Catalyst 2]

A granular catalyst 2 was obtained in the same manner as in Example 1, except that the obtained first catalyst-2 was mixed with the second catalyst such that the content of the first catalyst-2 became 25.0 mass % based on the total weight of the mixed catalyst (total mass of the first and second catalysts).

The content of gallium (average gallium content) based on the total weight of the catalyst 2 (total mass of the first and second catalysts) was 0.05 mass %.

Example 3

Preparation of First Catalyst-3

A first catalyst-3 was obtained in the same manner as in Example 1, except that after gallium-supported crystalline aluminosilicate in which 0.8 mass % of gallium was supported on proton-type crystalline aluminosilicate was obtained, the concentration of an aqueous diammonium hydrogen phosphate solution was adjusted such that 0.7 mass % (value calculated when the total mass of the crystalline aluminosilicate is regarded as being 100 mass %) of phosphorus was supported on the gallium-supported crystalline aluminosilicate, and the gallium-supported crystalline aluminosilicate was impregnated with 30 g of the aqueous solution.

[Preparation of Catalyst 3]

A granular catalyst 3 was obtained in the same manner as in Example 1, except that the obtained first catalyst-3 was mixed with the second catalyst such that the content of the first catalyst-3 became 20.0 mass % based on the total weight of the mixed catalyst (total mass of the first and second catalysts).

The content of gallium (average gallium content) based on the total weight of the catalyst 3 (total mass of the first and second catalysts) was 0.16 mass %.

Example 4

Preparation of First Catalyst-4

A first catalyst-4 was obtained in the same manner as in Example 1, except that after gallium-supported crystalline aluminosilicate in which 1.5 mass % of gallium was supported on proton-type crystalline aluminosilicate was obtained, the concentration of an aqueous diammonium hydrogen phosphate solution was adjusted such that 0.7 mass % (value calculated when the total mass of the crystalline aluminosilicate is regarded as being 100 mass %) of phosphorus was supported on the gallium-supported crystalline aluminosilicate, and the gallium-supported crystalline aluminosilicate was impregnated with 30 g of the aqueous solution.

[Preparation of Catalyst 4]

A granular catalyst 4 was obtained in the same manner as in Example 1, except that the obtained first catalyst-4 was mixed with the second catalyst such that the content of the first catalyst-4 became 10.0 mass % based on the total weight of the mixed catalyst (total mass of the first and second catalysts).

The content of gallium (average gallium content) based on the total weight of the catalyst 4 (total mass of the first and second catalysts) was 0.15 mass %.

Example 5

Preparation of Catalyst 5

A granular catalyst 5 was obtained in the same manner as in Example 1, except that the obtained first catalyst-4 was mixed with the second catalyst such that the content of the first catalyst-4 became 50.0 mass % based on the total weight of the mixed catalyst (total mass of the first and second catalysts).

The content of gallium (average gallium content) based on the total weight of the catalyst 5 (total mass of the first and second catalysts) was 0.75 mass %.

Example 6

Preparation of First Catalyst-5

120 g of proton-type crystalline aluminosilicate was impregnated with 120 g of an aqueous zinc nitrate hexahydrate solution such that 0.2 mass % (value calculated when the total mass of the crystalline aluminosilicate is regarded as being 100 mass %) of zinc was supported on the proton-type crystalline aluminosilicate, and the resultant was dried at 120° C. Thereafter, the resultant was calcined for 3 hours at 780° C. under an air flow, thereby obtaining zinc-supported crystalline aluminosilicate.

Subsequently, 30 g of the obtained zinc-supported crystalline aluminosilicate was impregnated with 30 g of an aqueous diammonium hydrogen phosphate solution such that 0.7 mass % (value calculated when the total mass of the crystalline aluminosilicate is regarded as being 100 mass %) of phosphorus was supported on the zinc-supported crystalline aluminosilicate, and the resultant was dried at 120° C. Thereafter, the resultant was calcined for 3 hours at 780° C. under an air flow, thereby obtaining a first catalyst-5 containing crystalline aluminosilicate, zinc, and phosphorus.

[Preparation of Catalyst 6]

A granular catalyst 6 was obtained in the same manner as in Example 1, except that the obtained first catalyst-5 was mixed with the second catalyst such that the content of the first catalyst-5 became 25 mass % based on the total weight of the mixed catalyst (total mass of the first and second catalysts).

The content of zinc (average zinc content) based on the total weight of the catalyst 6 (total mass of the first and second catalysts) was 0.05 mass %.

Reference Example 1

Preparation of Catalyst 7

A pressure of 39.2 MPa (400 kgf) was applied to the second catalyst so as to form tablets, and the resultant was coarsely pulverized to have a size of 20 to 28 mesh, thereby obtaining a granular catalyst 7.

The content of gallium (average gallium content) based on the total weight of the catalyst 7 was 0.0 mass %.

Reference Example 2

Preparation of Catalyst 8

A pressure of 39.2 MPa (400 kgf) was applied to the first catalyst-1 so as to form tablets, and the resultant was coarsely pulverized to have a size of 20 to 28 mesh, thereby obtaining a granular catalyst 8.

The content of gallium (average gallium content) based on the total weight of the catalyst 8 was 0.1 mass %.

Reference Example 3

Preparation of Catalyst 9

A pressure of 39.2 MPa (400 kgf) was applied to the first catalyst-2 so as to form tablets, and the resultant was coarsely pulverized to have a size of 20 to 28 mesh, thereby obtaining a granular catalyst 9.

The content of gallium (average gallium content) based on the total weight of the catalyst 9 was 0.2 mass %.

Reference Example 4

Preparation of Catalyst 10

A pressure of 39.2 MPa (400 kgf) was applied to the first catalyst-3 so as to form tablets, and the resultant was coarsely pulverized to have a size of 20 to 28 mesh, thereby obtaining a granular catalyst 10.

The content of gallium (average gallium content) based on the total weight of the catalyst 10 was 0.8 mass %.

Reference Example 5

Preparation of Catalyst 11

A pressure of 39.2 MPa (400 kgf) was applied to the first catalyst-4 so as to form tablets, and the resultant was coarsely pulverized to have a size of 20 to 28 mesh, thereby obtaining a granular catalyst 11.

The content of gallium (average gallium content) based on the total weight of the catalyst 11 was 1.5 mass %.

Reference Example 6

Preparation of Catalyst 12

A pressure of 39.2 MPa (400 kgf) was applied to the first catalyst-5 so as to form tablets, and the resultant was coarsely pulverized to have a size of 20 to 28 mesh, thereby obtaining a granular catalyst 12.

The content of zinc (average zinc content) based on the total weight of the catalyst 12 was 0.2 mass %.

The catalytic activity of the obtained catalysts 1 to 12 was evaluated as below.

[Measurement of Yield of Product]

By using a circulation type reaction device including a reactor filled with the catalysts 1 to 12 (10 ml), the oil feedstock having the properties shown in Table 1 was brought into contact with the catalysts and reacted under the condition of a reaction temperature: 550° and a reaction pressure: 0 MPaG. At this time, nitrogen as a diluent was introduced into the device such that the oil feedstock came into contact with the catalysts for 7 seconds.

The reaction was caused for 30 minutes under the above conditions, thereby producing monocyclic aromatic hydrocarbons having 6 to 8 carbon number. By using an FID gas chromatograph directly connected to the reaction apparatus, the composition of the product was analyzed, and the yield of the product was measured. The measurement results are shown in Tables 2 and 3.

The BTX yield and LPG yield measured for each catalysts were 31 mass % and 5 mass % for the catalyst 1, 34 mass % and 4 mass % for the catalyst 2, 32 mass % and 4 mass % for the catalyst 3, 31 mass % and 4 mass % for the catalyst 4, 27 mass % and 3 mass % for the catalyst 5, 33 mass % and 6 mass % for the catalyst 6, 29 mass % and 7 mass % for the catalyst 7, 31 mass % and 5 mass % for the catalyst 8, 33 mass % and 4 mass % for the catalyst 9, 28 mass % and 2 mass % for the catalyst 10, 23 mass % and 2 mass % for the catalyst 11, and 33 mass % and 5 mass % for the catalyst 12.

The calculated values of the Table 2 are values calculated from the BTX yield and LPG yield of each of the first and second catalysts used for preparing the catalysts 1 to 6 of examples and the mixing ratio between the first and second catalysts. The formulae will be shown below.

BTX yield(mass%)=BTX yield of first catalyst(before mixing)(mass%)×proportion of first catalyst mixed based on the total weight of mixed catalyst+BTX yield of second catalyst(before mixing)(mass%)×proportion of second catalyst mixed based on the total weight of mixed catalyst     Formula (1)

LPG yield(mass%)=LPG yield of first catalyst(before mixing)(mass%)×proportion of first catalyst mixed based on the total weight of mixed catalyst+LPG yield of second catalyst(before mixing)(mass%)×proportion of second catalyst mixed based on the total weight of mixed catalyst     Formula (2)

The increase rate is a percentage of proportion obtained by dividing the value of the BTX yield and LPG yield, which are measured when the catalysts 1 to 6 of examples are used, by the corresponding calculated value respectively. The formula will be shown below.

Increase rate of BTX yield(mass%)=BTX yield(measured value)/BTX yield(calculated value)×100     Formula (3)

Increase rate of LPG yield(mass%)=LPG yield(measured value)/LPG yield(calculated value)×100     Formula (4)

TABLE 1

| Properties of raw material | | | Analysis method |
|---|---|---|---|
| Density (measured at 15° C.) | g/cm³ | 0.908 | JIS K 2249 |
| Kinematic viscosity (measured at 30° C.) | mm²/s | 3.645 | JIS K 2283 |

TABLE 1-continued

| | Properties of raw material | | | Analysis method |
|---|---|---|---|---|
| Distillation properties | Initial boiling point | ° C. | 177.5 | JIS K2254 |
| | 10 volume % distillation temperature | ° C. | 226.5 | |
| | 50 volume % distillation temperature | ° C. | 276.0 | |
| | 90 volume % distillation temperature | ° C. | 350.0 | |
| | Endpoint | ° C. | 377.0 | |
| Composition analysis | Saturated fraction | Volume % | 34 | JPI-5S-49 |
| | Olefin fraction | Volume % | 8 | |
| | Total aromatic fraction | Volume % | 58 | |
| | Monocyclic aromatic fraction | Volume % | 23 | |
| | Bicyclic aromatic fraction | Volume % | 26 | |
| | Aromatic fraction having 3 or more rings | Volume % | 9 | |

TABLE 2

| | | Example 1 | Example 2 | Example 3 | Example 4 | Example 5 | Example 6 |
|---|---|---|---|---|---|---|---|
| Catalyst | | Catalyst 1 | Catalyst 2 | Catalyst 3 | Catalyst 4 | Catalyst 5 | Catalyst 6 |
| First catalyst | | First catalyst-1 | First catalyst-2 | First catalyst-3 | First catalyst-4 | First catalyst-4 | First catalyst-5 |
| Second catalyst | | Second catalyst | Second catalyst | Second catalyst | Second catalyst | Second catalyst | Second catalyst |
| Content of phosphorus in first catalyst (based on crystalline aluminosilicate) (mass %) | | 0.70 | 0.70 | 0.70 | 0.70 | 0.70 | 0.70 |
| Content of gallium or zinc in first catalyst (based on crystalline aluminosilicate) (mass %) | | 0.10 | 0.20 | 0.80 | 1.50 | 1.50 | 0.20 |
| Content of phosphorus in second catalyst (based on crystalline aluminosilicate) (mass %) | | 0.70 | 0.70 | 0.70 | 0.70 | 0.70 | 0.70 |
| Content of first catalyst based on the total weight of mixed catalyst (mass %) | | 50.0 | 25.0 | 20.0 | 10.0 | 50.0 | 25.0 |
| Average content of gallium or zinc (based on total amount of mixed catalyst) (mass %) | | 0.05 | 0.05 | 0.16 | 0.15 | 0.75 | 0.05 |
| Measured value | BTX yield (mass %) | 31 | 34 | 32 | 31 | 27 | 33 |
| | LPG yield (mass %) | 5 | 4 | 4 | 4 | 3 | 6 |
| Calculated value | BTX yield (mass %) | 30.0 | 30.0 | 28.8 | 28.4 | 26.0 | 30.2 |
| | LPG yield (mass %) | 6.0 | 6.3 | 6.0 | 6.5 | 4.5 | 6.4 |
| Increase rate | BTX yield (mass %) | 103 | 113 | 111 | 109 | 104 | 109 |
| | LPG yield (mass %) | 83 | 64 | 67 | 62 | 67 | 94 |

TABLE 3

| | Reference example 1 | Reference example 2 | Reference example 3 | Reference example 4 | Reference example 5 | Reference example 6 |
|---|---|---|---|---|---|---|
| Catalyst | Catalyst 7 | Catalyst 8 | Catalyst 9 | Catalyst 10 | Catalyst 11 | Catalyst 12 |
| First catalyst | — | First catalyst-1 | First catalyst-2 | First catalyst-3 | First catalyst-4 | First catalyst-5 |
| Second catalyst | Second catalyst | — | — | — | — | — |
| Content of phosphorus in first catalyst (based on crystalline aluminosilicate) (mass %) | — | 0.70 | 0.70 | 0.70 | 0.70 | 0.70 |
| Content of gallium or zinc in first catalyst (based on crystalline aluminosilicate) (mass %) | — | 0.10 | 0.20 | 0.80 | 1.50 | 0.20 |

TABLE 3-continued

|  | Reference example 1 | Reference example 2 | Reference example 3 | Reference example 4 | Reference example 5 | Reference example 6 |
|---|---|---|---|---|---|---|
| Content of phosphorus in second catalyst (based on crystalline aluminosilicate) (mass %) | 0.70 | — | — | — | — | — |
| Content of first catalyst based on the total weight of mixed catalyst (mass %) | 0 | 100.0 | 100.0 | 100.0 | 100.0 | 100.0 |
| Average content of gallium or zinc (based on total amount of mixed catalyst) (mass %) | 0 | 0.10 | 0.20 | 0.80 | 1.50 | 0.20 |
| Measured value BTX yield (mass %) | 29 | 31 | 33 | 28 | 23 | 33 |
| LPG yield (mass %) | 7 | 5 | 4 | 2 | 2 | 5 |

[Result]

While the BTX yield of Examples 1 to 6 using the catalysts 1 to 6 was higher (103 mass % in Example 1, 113 mass % in Example 2, 111 mass % in Example 3, 109 mass % in Example 4, 104 mass % in Example 5, and 109 mass % in Example 6) than the BTX yield expected from the BTX yield of Reference examples 1 to 6, the LPG yield thereof was lower (83 mass % in Example 1, 64 mass % in Example 2, 67 mass % in Example 3, 62 mass % in Example 4, 67 mass % in Example 5, and 94 mass % in Example 6) than the expected value.

These results imply that on the premise that the same BTX will be obtained, if the method of the present embodiment is used, the content of gallium or zinc in the catalyst to be used can be further reduced compared to the related art.

So far, preferable embodiments of the present invention have been described, but the present invention is not limited to the above embodiments. Within a scope that is not extrinsic to the object of the present invention, the constitutional elements can be added, omitted, substituted, and modified in other ways. The present invention is restricted not by the above description but only by the claims attached.

The invention claimed is:

1. A production method of monocyclic aromatic hydrocarbons having 6 to 8 carbon number, comprising a step of bringing oil feedstock having a 10 volume % distillation temperature of 140° C. or higher and a 90 volume % distillation temperature of 380° C. or lower into contact with a catalyst for producing monocyclic aromatic hydrocarbons that includes a mixture containing a first catalyst and a second catalyst, wherein the first catalyst contains crystalline aluminosilicate, phosphorus, and at least one of gallium and zinc and the second catalyst contains crystalline aluminosilicate and phosphorus but does not contain gallium or zinc.

2. The production method of monocyclic aromatic hydrocarbons having 6 to 8 carbon number according to claim 1, wherein in the first catalyst, the content of gallium and/or zinc contained in the crystalline aluminosilicate is 0.05 to 2.0 mass % based on the crystalline aluminosilicate.

3. The production method of monocyclic aromatic hydrocarbons having 6 to 8 carbon number according to claim 1, wherein in the catalyst for producing monocyclic aromatic hydrocarbons, the content of gallium and/or zinc is 0.02 to 1.0 mass % based on the weight of the catalyst.

4. The production method of monocyclic aromatic hydrocarbons having 6 to 8 carbon number according to claim 1, wherein the crystalline aluminosilicate is medium pore size zeolite.

5. The production method of monocyclic aromatic hydrocarbons having 6 to 8 carbon number according to claim 1, wherein the crystalline aluminosilicate is MFI type zeolite.

6. The production method of monocyclic aromatic hydrocarbons having 6 to 8 carbon number according to claim 1, wherein the oil feedstock contains light cycle oil generated by a fluidized catalytic cracking.

7. The production method of monocyclic aromatic hydrocarbons having 6 to 8 carbon number according to any one of claim 1,
wherein the oil feedstock is brought into contact with the catalyst for producing monocyclic aromatic hydrocarbons by using a fluidized-bed reaction equipment.

* * * * *